June 26, 1945.  M. C. ALYEA  2,379,210

EXPANSION CHUCK

Filed May 30, 1944

INVENTOR,
MARVIN C. ALYEA.
BY
Chas. E. Townsend
ATTORNEY.

Patented June 26, 1945

2,379,210

UNITED STATES PATENT OFFICE 2,379,210

EXPANSION CHUCK

Marvin C. Alyea, Mill Valley, Calif.

Application May 30, 1944, Serial No. 537,987

4 Claims. (Cl. 279—2)

This invention relates to chucks for gripping pipes, and particularly to an expansion chuck which will grip the interior of a nipple or short section of pipe, and which latter is to be threaded externally.

The object of the present invention is the provision of a simple, practical expansion chuck for use especially in threading small pipe nipples on either or both ends, or in the formation of a continuous thread thereon without marring the threaded portion. Another object is to provide an expansion chuck which will avoid the difficulties heretofore existing in such type of chuck by having the metal shavings operating to clog and interfere with the proper operation of the chuck. Still another object is to provide a chuck which is operated quickly to grip or release the pipe and without the use of screws or levers for that purpose.

Having reference to the accompanying drawing.

Figure 1:
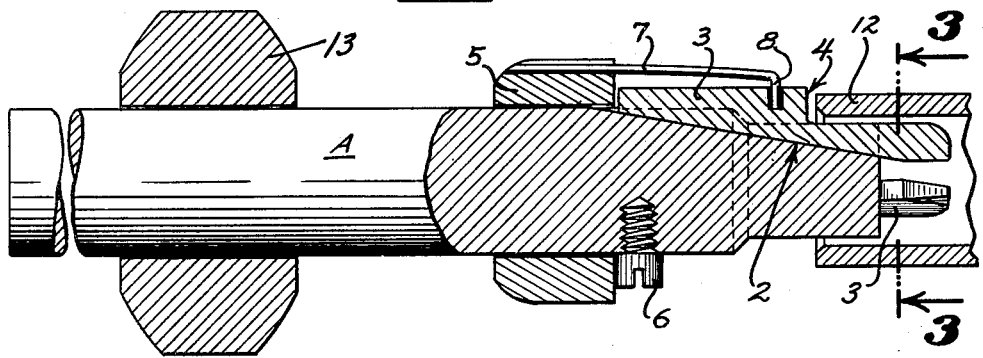
Fig. 1 is a longitudinal sectional view of the expansion chuck with the jaws retracted.
Figure 2:
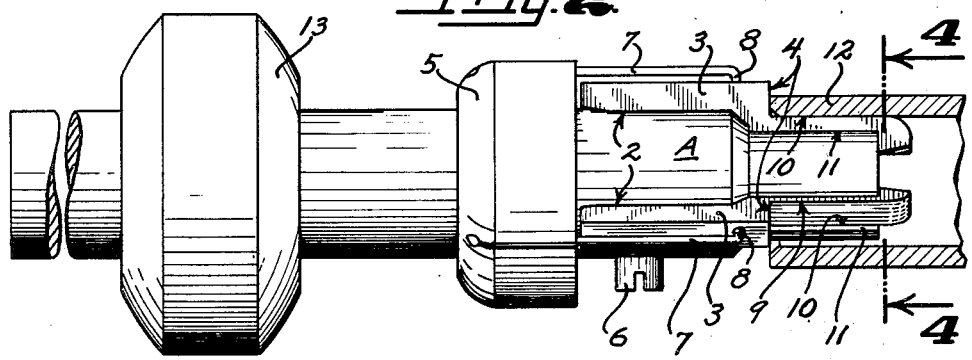
Fig. 2 is a side elevational view of the same with the jaws expanded to engage the interior surface of a pipe.
Figure 3:
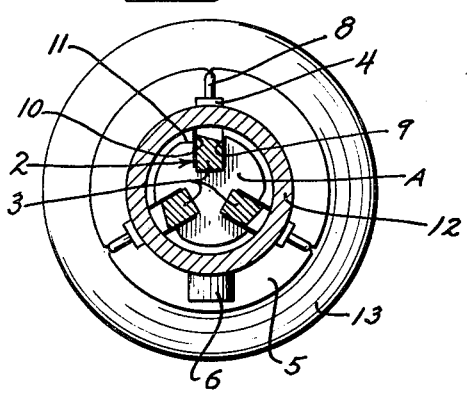
Fig. 3 is a cross-sectional view taken on the line 3—3 of Fig. 1.
Figure 4:
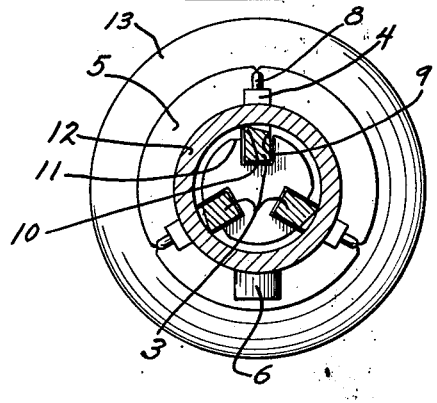
Fig. 4 is a cross-sectional view taken on the line 4—4 of Fig. 2.

A represents a steel shaft, of suitable diameter and convenient tool length. A practical size of the shaft is three-quarter inch steel and ten to twelve inches in length. The diameter and length, of course, depend more or less on the size of the pipe on which the tool is to operate. One end of the shaft or shank A has a series of tapered, radial, milled slots 2, being of greater depth at the end of the shaft and gradually tapering to zero at the back end. Each slot is adapted to receive a wedge-shaped jaw 3, of special design. The top side of each jaw is cut away so as to form a ledge 4 which is to form a pipe abutment for a purpose later to be described.

The several wedge-shaped jaws abut at their rear ends against a collar 5 which has limited sliding movement on the shaft or shank A, the forward movement of the collar being limited by a stop pin or dowel 6 tapped into the shank A. The collar 5 carries a series of spring connectors 7, one for each jaw. Each of these springs has a radially extending bent end or hooked portion 8 fitting into a corresponding recess of a respective jaw, the other ends of the springs being anchored in the collar 5. The result is that as the collar 5 is shifted back and forth on the shaft 4, the jaws are made to move in unison and to expand or contract accordingly.

Normally, with the collar 5 shoved forward against the stop pin 6, the jaws are radially contracted and their forward ends extend a short distance beyond the front end of shaft A. The cutaway portions of the jaws have their outer edges beveled so that one side, 9, of the cutaway portions of each jaw (when the collar 5 is against the pin 6) will be substantially in the plane of the circumference of the adjacent reduced end of the shaft while the opposite edge 10 of this reduced portion of a jaw will present a sharp cutting edge which will act, when the jaws are pushed backwardly and expanded, to bite into the interior of the pipe. This tendency to a biting action is accentuated by cutting away slightly the adjacent wall of the slot 2, as shown at 11. In other words, by beveling the edge 11 of a cutaway portion of a jaw in the manner shown, the so-called cutting edge 10 will be of slightly greater radial depth than will be the opposite edge 9, which latter lies normally in the plane of the periphery of the end of the shaft A.

In operation, the collar 5 and jaws are moved forward until the collar strikes against the pin 6. The jaws are now in retracted position of minimum diameter. The nipple 12 to be threaded is slipped over the reduced portion of the jaws and the corresponding end of the shaft A until it abuts against the shoulders 4. Further pressure of the pipe against the shoulders forces the jaws up their respective inclines until the limit of expansion of the jaws has been reached and the pipe is firmly gripped in readiness for the threading operation.

When it is desired to release a pipe, an annular tappet 13 is provided which has a loose sliding movement on the shaft and by which a blow against the collar 5 may be given to cause all of the jaws to be driven forward simultaneously down the respective inclines until the diameter of the gripping portions of the jaws have contracted sufficiently to release the pipe.

One of the difficulties heretofore experienced with the use of expansion chucks is that the metal shavings operate to clog and interfere with the operation. Hence the reason for the ledges 9 formed by the sharp corners on one edge of each jaw, which ledges bite into the interior of the pipe sufficiently to grip it against rotational movement. As the jaws shoulder against the collar 5 and as the annular tappet 13 is coaxial with the collar and jaws and simultaneously engages the collar around its entire circumference when operated hammer-fashion as a tappet, the several jaws are driven down their incline as a unit to effect the contractive action by which the pipe is released.

I claim:

1. An expansion chuck comprising in combination a shaft having a series of radially inclined slots at one end, a wedge-shaped jaws operating in each slot, the several jaws abutting against a collar which in turn is movable on and axially of the shaft, spring connections between the collar and the several jaws, and a tappet member movable on the shaft for the delivery of a sharp blow upon the collar to release the jaws simultaneously.

2. An expansion chuck comprising in combination a shaft having a series of radially inclined slots at one end, a wedge-shaped jaw operating in each slot, the several jaws abutting against a collar which in turn is movable on and axially of the shaft, connections between the collar and the several jaws whereby they move in unison, said jaws having their forward ends cut away to form a shoulder on each jaw, against which shoulders a pipe may abut, the upper edges of each jaw portion which fit within the pipe being formed on an incline to produce a sharp edge at one side of the jaw whereby to grip the pipe more firmly, and means acting against the collar to move the same forwardly to release the jaws from the pipe.

3. An expansion chuck for holding pipe nipples and the like comprising a shaft having a series of radially lengthwise extending tapered slots, wedge-shaped jaws fitting said slots, a collar slidable on the shaft and abutting against the rear ends of the jaws, springs fixed in the collar and connected with the jaws to maintain the jaws in position in the slots and at the same time permit lengthwise movement of the jaws on the shaft, a stop member on the shaft to limit the forward movement of the collar, and a tappet slidable on the shaft and engageable circumferentially of the collar to move the latter and jaws to release and engage the pipe.

4. An expansion chuck for holding pipe nipples and the like comprising a shaft having a series of radially lengthwise extending, tapered slots, wedge-shaped jaws fitting said slots, a collar slidable on the shaft and abutting against the rear ends of the jaws, springs fixed in the collar and connected with the jaws to maintain the jaws in position in the slots and at the same time permit lengthwise movement of the jaws on the shaft, a stop member on the shaft to limit the forward movement of the collar, and a tappet slidable on the shaft and engageable circumferentially of the collar to move the latter and jaws to release and engage the pipe, said jaws having their forward ends cut away to constitute shoulders against which a pipe to be threaded engages and the adjacent edges of the jaws within a pipe so engaged being tapered so that one edge of a cutaway portion of each jaw is of greater radial depth than the opposite edge of the same jaw and the walls of the radial slots on the sides adjacent to the deeper edge of the jaw being cut away to provide greater clearance to the biting edge of the jaw.

MARVIN C. ALYEA.